United States Patent [19]

Bolan

[11] 3,968,048

[45] July 6, 1976

[54] DRAIN CLEANING COMPOSITIONS

[75] Inventor: Joseph A. Bolan, Cincinnati, Ohio

[73] Assignee: The Drackett Company, Cincinnati, Ohio

[22] Filed: Feb. 14, 1975

[21] Appl. No.: 550,057

[52] U.S. Cl. ............................... 252/157; 252/100; 252/103; 252/142; 252/156; 252/DIG. 10; 134/3; 134/29; 134/30
[51] Int. Cl.$^2$ ............................................. C11D 7/06
[58] Field of Search ............ 252/156, 157, 142, 70, 252/100, 90, 103, DIG. 10, 192, 188.3 R; 44/3 A, 3 B, 3 C, 3 D, 3 R; 134/3, 22 C, 29, 30, 103

[56] References Cited

UNITED STATES PATENTS 3,791,977   2/1974   Aneel et al. ..................... 252/156

FOREIGN PATENTS OR APPLICATIONS 1,590,651   7/1968   France ............................ 252/103

OTHER PUBLICATIONS

"Oxone", E.I. duPont de Nemours and Co. (1961), Wilmington, 98, Delaware.

*Primary Examiner*—Mayer Weinblatt
*Attorney, Agent, or Firm*—David J. Mugford; George A. Mentis; Samuel J. DuBoff

[57] ABSTRACT

A granular drain cleaning composition which remains physically separated in two parts until utilization in the presence of water, useful for freeing a clogged drain of grease, hair, oils, and other debris is disclosed. One part contains an alkali metal hydroxide which is either sodium hydroxide or potassium hydroxide, the other part contains one or more ingredients that are chemically incompatible in the dry state with the alkali metal hydroxide, the ingredients including an acidic agent which is sodium bisulfate or citric acid, and an oxidizing agent. The oxidizing agent is preferably sodium carbonate peroxide, sodium perborate monohydrate or monopotassium peroxymonosulfate. Optionally, an anionic or nonionic surfactant foaming agent can be included.

4 Claims, No Drawings

DRAIN CLEANING COMPOSITIONS

BACKGROUND OF THE INVENTION

It has been well known to use hot alkaline cleaning compositions for unclogging drain pipes in sinks, bathtubs and other tub drains from the build-up effect of hair, solidified grease, oils and other debris. For example, U.S. Pat. Nos. 3,489,689 to Tao et al and 3,344,078 to Graham et al teach the use of alkali metal hydroxide in combination with aluminum as effective drain cleaner compositions. However, it is well known that the combination of these two ingredients in the presence of water can lead to evolution of hydrogen gas due to their reaction. Accordingly, various solutions to this problem have been proposed. For example, U.S. Pat. No. 3,537,898 to Fidler proposes a physical separation of the aluminum particles from the caustic alkali metal hydroxide until actual use in the clogged drain. This has not proved to be totally effective.

Other types of drain cleaning compositions involving materials different than aluminum for producing the necessary heat for making such a composition effective as a drain cleaner include those involving the reaction between caustic alkali and a substance which is acidic in nature. For example, U.S. Pat. No. 1,143,295 to McNabb discloses a heat producing composition consisting of a combination of an alkaline substance combined with one or more oxidizing agents such as oxalic acid or a persulfate. It is mentioned that such a composition can be used for heating food products as well as attacking and dissolving solid matter found in drainage and sewer pipes. Also, U.S. Pat. No. 3,791,977 to Ancel et al discloses a dry powder exothermic cleaning composition which contains a base, an acidic agent and optionally various supplemental ingredients including surfactants and chlorine or oxygen-generating compounds as bleaching agents. However, such compositions leave a lot to be desired regarding loss of effectiveness of the active ingredients during storage due to chemical incompatibility of one or more of the ingredients with each other, and additionally resulting from inherent moisture contained in the ingredients.

SUMMARY OF THE INVENTION

Accordingly, such problems of the prior art are substantially overcome by providing a granular drain cleaning composition which remains physically separated into Parts A and B until utilization in the presence of water wherein:

a. Part A comprises 20 to 40 parts by weight of an alkali metal hydroxide selected from the group consisting of sodium hydroxide and potassium hydroxide; and b. Part B is a mixture containing one or more ingredients that are chemically incompatible in the dry state with said alkali metal hydroxide, said mixture comprising 10 to 40 parts by weight of an acidic agent selected from the group consisting of sodium bisulfate and citric acid, and 1 to 10 parts by weight of an oxidizing agent selected from the group consisting of sodium carbonate peroxide, sodium perborate monohydrate and monopotassium peroxymonosulfate. Optionally, and desirably, the compositions additionally contain 0.1 to 5.0 parts by weight of a foaming agent selected from the group consisting of anionic and nonionic surfactants.

A particularly effective drain cleaning composition is one wherein Part A comprises 30 parts by weight of sodium hydroxide; and Part B comprises 35.5 parts by weight of a mixture consisting essentially of 84.5 weight percent of sodium bisulfate, 14.1 weight percent sodium carbonate peroxide and 1.4 weight percent of an anionic surfactant made by neutralizing with sodium hydroxide the reaction product of alpha-olefins having 14 to 16 carbon atoms in the olefin chain with sulfur trioxide, said weight percent being based upon the total weight of Part B.

DETAILED DESCRIPTION OF THE INVENTION

The compositions are advantageously manufactured in dry powder form and become active in the drain when contacted with water. Such water contact int the drain trap promotes a reaction between the alkali metal hydroxide and the acidic agent which is essentially an exothermic neutralization reaction producing a hot solution having an alkaline pH. The heat, of course, is important to aid in melting the grease and oily buildup in the drain. The specific oxidizing agents employed add additional alkalinity to the solution and, in the presence of the heat generated, release hydrogen peroxide into the solution which is useful in promoting the attack of hair. Such hydrogen peroxide containing solutions are not stable in the presence of hot alkaline materials and tend to totally decompose after several minutes of such contact with the attendant evolution of oxygen gas. The large quantities of oxygen released promote turbulence and allow for a more effective reaction throughout the drain trap system. The optional, but desirable, addition of a foaming agent, which can be an anionic or nonionic surfactant having foam producing properties, increases the volume of solution by entrapping the oxygen gas evolved during the reaction. The increased volume allows the active ingredients to more effectively reach all areas of the clogged drain trap, thereby promoting more complete dissolution and removal of the clogging materials.

Such drain cleaning compositions including the specific alkali metal hydroxide, acidic agents and oxidizing agents disclosed herein, optionally in combination with a foaming agent, have been found to be most effective in dissolving solid grease, oil, hair and other debris found in tub and sink drain traps. Heretofore, such highly effective drain cleaning compositions were not generally available in view of the chemical incompatibility of one or more of the ingredients. Specifically, such peroxyoxidizing agents as sodium carbonate peroxide, sodium perborate monohydrate and monopotassium peroxymonosulfate are unstable even in the dry form in admixture with alkali metal hydroxides, tending to react to form oxygen gas and a non-flowable, hard cake mixture which would totally inactivate the ingredients for their intended drain cleaning purpose. However, such oxidizing agents have been found to be compatible in the dry state with the particular acidic agents utilized herein, i.e. sodium bisulfate and citric acid.

Moreover, the commercially available grades of many acidic agents such as oxalic acid, citric acid, sodium bisulfate, sulfamic acid and the like additionally contain some degree of water content therein, either in the form of an impurity or as a hydrate thereof. Thus, a mixture containing such commercial grade of acidic agent in combination with alkali metal hydroxides would be unstable and react due to the ionization effect of the water content upon the substances and the attendant neutralization reaction resulting therefrom.

Therefore, it has been found most advantageous to physically separate the alkali metal hydroxide from the acidic agent and the oxidizing agent due to such chemical incompatibility. Practically, this is done by enclosing the alkali material in one sealed package or container and acidic agent and oxidizing agent in another sealed package or container. The amounts given below have generally been found to be useful with the conventional tub or sink traps found in most households. The typical capacity of such traps are approximately 150 milliliters. Through experimentation, it has been found that at amounts higher than the maximum given for each ingredient below, inadequate mixing and dissolving of the ingredients occurs. At amounts lower than the minimum given for each ingredient below, insufficient heat generation necessary to completely dissolve the grease, oils, hair and debris found in the drain trap results. Therefore, for drain traps having a capacity greater than 150 milliliters, a proportionally greater amount of each of the ingredients can be utilized in such cases.

Insofar as the alkali metal hydroxides are concerned, it has been found most preferable to use from about 20 to 40 grams of sodium hydroxide or potassium hydroxide. This is generally contained in one of the two packages for the composition.

The acidic agent and the oxidizing agent are generally contained in the second package which is physically separated from the first package. By acidic agent, it is meant to include either an acid such as citric acid, as well as an acid-forming salt such as sodium bisulfate. The concentration which is found to be most useful for the acidic agent is 10 to 40 grams. Such a concentration provides for an effective amount of heat generation due to the exothermic neutralization reaction with the alkali metal hydroxide in the presence of water and results in a final hot drain cleaning solution which is still strongly alkaline. It is well known that such hot alkaline solutions are necessary for dissolving the solid grease and oil contaminants in the drain trap in promoting clearance thereof.

From about 1 to 10 grams of sodium carbonate peroxide or sodium perborate monohydrate or monopotassium peroxymonosulfate as oxidizing agents have been found to be most effective when combined with the above mentioned alkali metal hydroxides and acidic agents in a drain cleaning composition. Since these specific oxidizing agents are all chemically incompatible with sodium hydroxide or potassium hydroxide in the dry state, they are incorporated in the package containing the acidic agent with which compatibility exists.

Although optional, it has been found desirable to include a wetting agent having foaming qualities in alkaline solutions which can be either an anionic or nonionic surfactant. Preferably, from about 0.1 to 5.0 grams are included. Such wetting or foaming agents are generally compatible with either the alkali or acidic-oxidizing agent combination and, therefore, can be incorporated in either package.

Any of the conventional detergents classed as synthetic nonsoap anionic and nonionic surface acitve compounds which promote a moderate degree of foaming of aqueous solutions may be used. Anionic surface active compounds can be broadly described as compounds which contain hydrophilic or lyophilic group. These compounds include sulfated or sulfonated alkyl, aryl and alkyl aryl hydrocarbons and alkali metal salts thereof, for example, sodium salts of long chain alkyl sulfates, sodium salts of alpha-olefin sulfonates (e.g. Ultrawet AOK made by Arco Chemical Co. and Bioterge AS-90F from Stepan Chemical Co. made by neutralizing with sodium hydroxide the reaction product of alpha-olefins having 14 to 16 carbon atoms in the olefin chain with sulfur trioxide), sodium salts of sodium lauryl sulfate (e.g. Avirol 122 concentrate made by Henkel, Inc.) sodium salts of alkyl naphthalene sulfonic acids, sodium salts of sulfonated abietenes, sodium salts of alkyl benzene sulfonic acids particularly those in which the alkyl group contains from 8–24 carbon atoms; sodium salts of sulfonated mineral oils and sodium salts of sulfosuccinic acid esters such as sodium dioctyl sulfosuccinate.

Advantageous anionic surfactants include the higher alkyl aryl sulfonic acids and their alkali metal and alkaline earth metal salts such as for example sodium dodecyl benzene sulfonate (e.g. Ultrawet SK made by Arco Chemical Co. and Sulframin 40R made by Witco Chemical Co.), sodium tridecyl sulfonate, magnesium dodecyl benzene sulfonate, potassium tetradecyl benzene sulfonate, ammonium dodecyl toluene sulfonate, lithium pentadecyl benzene sulfonate, sodium dioctyl benzene sulfonate, disodium dodecyl benzene disulfonate, disodium di-isopropyl naphthalene disulfonate and the like as well as the alkali metal salts of fatty alcohol esters of sulfuric and sulfonic acids, the alkali salts of alkyl aryl (sulfothioic acid) ethers and the alkyl thiosulfuric acid, etc. Preferred anionic organic surface active agents are, as noted hereinbefore, sodium salts of alkyl benzene sulfonic acids and particularly preferred sodium salts of alkyl benzene sulfonic acids are those in which the alkyl group or radical contains 10 to 18 carbon atoms in a straight (i.e., unbranched) chain.

Nonionic surface active compounds can be broadly described as compounds which do not ionize but usually acquire hydrophilic characteristics from an oxygenated side chain, such as polyoxyethylene, while the lyophilic part of the molecule may come from fatty acids, phenols, alcohols, amides or amines. Examples of nonionic surfactants include products formed by condensing one or more alkylene oxides of 2 to 4 carbon atoms, such as ethylene oxide or propylene oxide, preferably ethylene oxide alone or with other alkylene oxides, with a relatively hydrophobic compound such as a fatty alcohol, fatty acid, sterol, a fatty glyceride, a fatty amine, an aryl amine, a fatty mercaptan, tall oil, etc. Nonionic surface active agents also include those products produced by condensing one or more relatively lower alkyl alcohol amines (such as methanolamine, ethanolamine, propanolamine, etc.) with a fatty acid such as lauric acid, cetyl acid, tall oil fatty acid, abietic acid, etc., to produce the corresponding amine.

Still other nonionic surface active compounds include the amine oxides and phosphine oxides and preferably the unsymmetrical trialkyl amine oxides and phosphine oxides wherein two of the alkyl groups are lower alkyl groups (1 to 4 carbon atoms) and the other alkyl group is a higher alkyl group (8 to 18 carbon atoms). Examples include dimethyldodecylamine oxide, dimethyl dodecylphosphine oxide, dimethyl tetradecyl amine oxide, dimethytetradecyl phosphine oxide, diethylhexadecylamine oxide, diethylhexadecylphosphine oxide and the like.

Particularly advantageous nonionic surface active agents are condensation products of a hydrophobic compound having at least 1 active hydrogen atom and a lower alkylene oxide (for example, the condensation product of an aliphatic alcohol containing from about 8 to about 18 carbon atoms) and from about 3 to about 30 mols of ethylene oxide per mol of the alcohol, or the condensation product of an alkyl phenol containing from about 8 to about 18 carbon atoms in the alkyl group and from about 3 to about 30 mols of ethylene oxide per mol of alkyl phenol (e.g. Igepal Co-630, Igepal DM-970 made by GAF Corp).

It is noted that the wetting or foaming agent is generally compatible in the dry state with either the alkali or the acidic agent-oxidizing agent mixture and can therefore be included in either package. Also, it is noted that the foaming agent could be solid or liquid, so long as, when in the liquid form, it does not result in an excessive amount of agglomeration of the ingredient particles.

Additional ingredients of a conventional nature can also be included in the composition and are represented by perfumes, coloring agents, germicides, antiseptics, bacteriostats, sequesterants and the like.

The following examples are given to further illustrate the present invention. It should be understood, however, that the invention is not limited thereto.

A 1-1/4 inch diameter drain trap having a U-bend as is found associated with household sinks in a great number of homes was used in Examples 1-4. The drain trap, having a capacity of about 150 milliliters was made of glass for ease of observation and was initially filled with water. Parts A and B of the cleaning composition were then added to the drain trap resulting in complete solution of the ingredient. The initial temperature of the room and water was 25°C.

EXAMPLE 1

| Part A | Amount in Grams |
|---|---|
| Sodium hydroxide | 30.0 |
| Part B | |
| Sodium bisulfate | 30.0 |
| Bioterge AS-90F | 0.5 |
| Sodium perborate monohydrate | 5.0 |

One minute after addition to the glass 1-¼ in. drain trap solution had increased 50°C in temperature and the pH was 13.2.

EXAMPLE 2

| Part A | Amount in Grams |
|---|---|
| Sodium hydroxide flake | 30.0 |
| Part B | |
| Sodium bisulfate | 30.0 |
| Bioterge AS-90F | 0.5 |
| Sodium perborate monohydrate | 5.0 |

One minute after addition to the glass 1-¼ inches drain trap the solution had increased 55°C in temperature and the pH was 13.0.

EXAMPLE 3

| Part A | Amount in Grams |
|---|---|
| Sodium hydroxide | 30.0 |
| Part B | |
| Sodium bisulfate | 30.0 |
| Oxone (monopotassium peroxymonosulfate) | 5.0 |
| Bioterge AS-90F | 0.5 |

One minute after addition to the glass 1-¼ inches drain trap the solution had increased 53°C in temperature and the pH was 13.0.

EXAMPLE 4

The total weight of Part A was 30 grams and the total weight of Part B was 35.5 grams.

| Part A | % By Weight |
|---|---|
| Perfume (Soap Blend No. 7917 made by Fries & Fries, Inc.) | 0.200 |
| Dye (Fast Wool Yellow – 36F made by Allied Chemical Corp.) | 0.007 |
| Sodium hydroxide prilled | 99.793 |
| | 100.000 |
| Part B | |
| Globular sodium bisulfate | 84.503 |
| Sodium carbonate peroxide[1] | 14.085 |
| Bio-Terge AS-90F[2] | 1.408 |
| Color additive (Synthaline Green pigment) | 0.004 |
| | 100.000 |

Notes:
[1]Sodium carbonate peroxide is supplied in a light granular grade with the formula repoted to be $2Na_2CO_3 \cdot 3H_2O_2$. The active oxygen content is 14% minimum. The supplier is the FMC Corp.
[2]Bio-Terge AS-90F is a surface active agent of 85–90% activity. The material is supplied by the Stepan Chemical Corp.

It is observed that the compositions in Examples 1–4 produced solution temperatures greater than 70°C which is far in excess of the temperature needed to melt most fats and greases derived from food products (e.g. melting point of pure rendered beef fats is about 35°–40°C).

EXAMPLE 5

To exemplify the relative chemical stability in the dry state with sodium bisulfate of one of the preferred oxidizing agents disclosed herein, namely sodium carbonate peroxide, active oxygen contents remaining in 6 sealed pouches containing the bisulfate and peroxide were determined after the following periods of time and at the temperature indicated. The active oxygen contents remaining were averaged for the 6 pouches and are given in Table 1 below:

TABLE I

| Time Interval | % Average Active Oxygen Content Remaining |
|---|---|
| Initial | 1.38 |
| 1 week at 125°F | 1.32 |
| 1 month at 100°F | 1.37 |
| 1 month at R.T. | 1.32 |
| 3 months at 100°F | 1.06 |

What is claimed is:
1. A granular drain cleaning composition consisting essentially of Parts A and B which are physically separated until utilization in the presence of water wherein:
   a. Part A consists essentially of 20 to 40 parts by weight of an alkali metal hydroxide selected from the group consisting of sodium hydroxide and potassium hydroxide; and
   b. Part B consists essentially of a mixture containing one or more ingredients that are chemically incompatible in the dry state with said alkali, said mixture comprising 10 to 40 parts by weight of an acidic agent selected from the group consisting of sodium bisulfate and citric acid, and 1 to 10 parts by weight of an oxidizing agent selected from the group consisting of sodium carbonate peroxide, sodium perborate monohydrate and monopotassium peroxymonosulfate.
2. The composition of claim 1 wherein Part A consists essentially of 30 parts by weight of sodium hydrox- ide; and Part B consists essentially of 35.5 parts by weight of a mixture comprising 84.5 weight percent of sodium bisulfate and 14.1 weight percent sodium carbonate peroxide, said weight percent being based upon the total weight of Part B.

3. The composition of claim 1 wherein said composition additionally contains 0.1 to 5.0 parts by weight of a foaming agent selected from the group consisting of anionic and nonionic surfactants.

4. The composition of claim 3 wherein Part A consists essentially of 30 parts by weight of sodium hydroxide; and Part B consists essentially of 35.5 parts by weight of a mixture consisting essentially of 84.5 weight percent of sodium bisulfate, 14.1 weight percent sodium carbonate peroxide and 1.4 weight percent of the sodium salt of an alpha olefin sulfonate having 14 to 16 carbon atoms in the olefin chain, said weight percent being based upon the total weight of Part B.

* * * * *